Patented May 15, 1923.

1,455,487

UNITED STATES PATENT OFFICE.

HEINRICH GRÜNHAGEN, OF BERLIN-KARLSHORST, GERMANY, ASSIGNOR, BY MESNE ASSIGNMENTS, TO THE CHEMICAL FOUNDATION, INC., A CORPORATION OF DELAWARE.

DYES OF THE ACRIDINE SERIES AND PROCESS FOR THEIR MANUFACTURE.

No Drawing. Application filed July 29, 1916, Serial No. 112,131. Renewed September 10, 1920. Serial No. 409,495.

*To all whom it may concern:*

Be it known that I, HEINRICH GRÜNHAGEN, a citizen of the Empire of Germany, residing at Berlin-Karlshorst, Germany, my P. O. address being Prinz Joachimstr. 13, Berlin-Karlshorst, Germany, have invented certain new and useful Improvements in New Dyes of the Acridine Series and Processes for Their Manufacture, of which the following is a specification.

In a co-pending application Serial Number 409494 I have described a process according to which new dyes of the acridine series may be obtained by heating a formyl-derivative of a diamine of the benzene series with a salt of a N-alkylated meta-diamine of the benzene series.

The present application pertains to another new process for the manufacture of acridine dyes. According to this process a formyl derivative of a N-alkylated meta-diamine of the benzene series is heated together with a salt of a meta-diamine of the benzene series. The formyl derivative may be N-monoalkylated or unsymmetrically N-dialkylated; on the other hand the meta-diamine, the salt of which is to be heated with the formyl compound, may also be N-monoalkylated or unsymmetrically N-dialkylated. In order to illustrate my new process the following equations are given as typical examples:

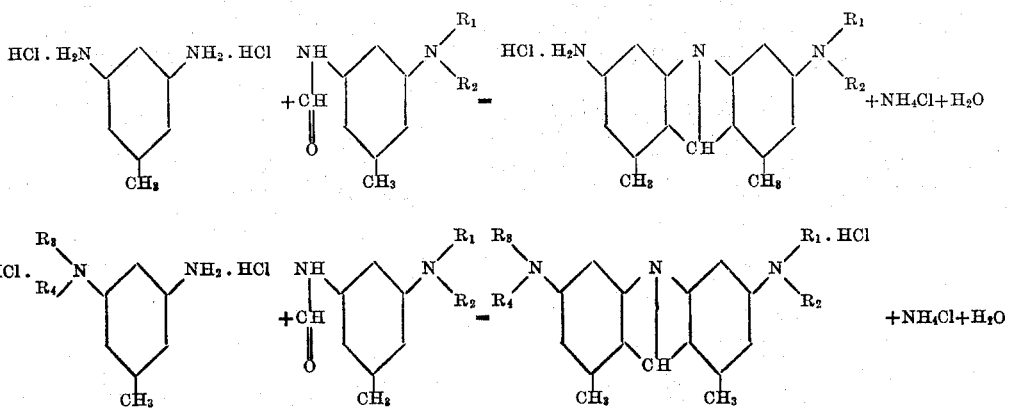

In these formulæ $R_1$ and $R_3$ mean univalent substituents, such as H or an alkyl group and $R_2$ and $R_4$ mean alkyl groups.

The first equation will be followed for example if meta-toluylenediamine-hydrochloride is heated with 4-formyl-amino-2-dimethylaminotoluene; the second equation occurs in heating 4-amino-2-ethylaminotoluene-hydrochloride with 4-formylamino-2-dimethylaminotoluene.

The new dyes thus obtainable are pure products possessing excellent dyeing qualities. For example they are not precipitated from the dye-bath by calcium carbonate. Furthermore my new products are level-dyeing and the tints obtained therewith do not change when the leather undergoes the so-called staking operation. The new process gives very good yields.

The following examples will serve as illustrative embodiments of my invention, the parts being by weight:

1. 17.8 parts of 4-formylamino-2-dimethylaminatoluene are melted together with 19.5 parts of meta-toluylenediamine-hydrochloride in an enamelled iron vessel, provided with an agitator, heated on an oil bath. The temperature is gradually raised to 185–190° C. and maintained until water is no longer evolved. The melt is then dissolved in 300 parts of water, the solution filtered and the dye precipitated by means of common salt and zinc chloride. The new dye in the dry state when pulverized forms a yellow brown powder easily soluble in water and dyes leather clear and deep yellow tints.

2. 17.8 parts of 4-formylamino-2-dimethylaminotoluene are melted together with 22.3 parts of 4-amino-2-ethylaminotoluene-hydrochloride. The melt may be worked up according to the foregoing example. The new dye in the dry state and pulverized forms a red brown powder easily soluble in water and dyes leather clear and deep yellow tints.

I wish to state expressly that my present invention is not limited to the foregoing examples or to the special conditions of reaction given therein. Furthermore other salts than hydrochlorides may be used, for instance sulfates. Finally instead of 4-formylamino-2-dimethylaminotoluene 4-formylamino-2-diethylaminotoluene or formyl-meta-amino-dimethylaniline may be employed; on the other side meta-phenylenediamine-hydrochloride or meta-aminodimethylaniline-hydrochloride or 4-amino-2-diethylaminotoluene-hydrochloride may be used instead of metatoluylenediamine-hydrochloride. In using such other ingredients it may be necessary to modify the reaction conditions in order to obtain the best results.

Having now described my invention what I claim is,—

1. As a new process for manufacturing dyes of the acridine series the process which consists in heating a formyl-derivative of a N-alkylated meta-diamine of the benzene series with a salt of a meta-diamine of the benzene series.

2. As a new process for manufacturing dyes of the acridine series the process which consists in heating a formyl-derivative of an unsymmetrically N-dialkylated meta-diamine of the benzene series with a salt of a meta-diamine of the benzene series.

3. As a new process for manufacturing dyes of the acridine series the process which consists in heating a formyl-derivative of an unsymmetrically N-dialkylated meta-diamine of the benzene series with a salt of an unsymmetrically N-dialkylated meta-diamine of the benzene series.

4. As a new process for manufacturing dyes of the acridine series the process which consists in heating 4-formyl-amino-2-dimethylaminotoluene with a N-alkylated meta-toluylenediamine-hydrochloride.

5. As a new process for manufacturing dyes of the acridine series the process which consists in heating 4-formyl-amino-2-dimethylaminotoluene with 4-amino-2-ethylaminotoluene-hydrochloride.

6. As a new article of manufacture the new acridine dye corresponding to the formula:

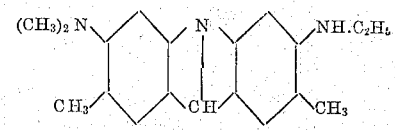

which dye in the dry state when pulverized forms a red-brown powder dyeing leather clear and deep yellow tints.

In testimony whereof I affixed my signature in presence of two witnesses.

HEINRICH GRÜNHAGEN.

Witnesses:
HENRY HASPER,
ALLEN F. JENNINGS.